United States Patent
Jeong et al.

(10) Patent No.: US 7,822,007 B2
(45) Date of Patent: Oct. 26, 2010

(54) TRANSMITTER IN FDMA COMMUNICATION SYSTEM AND METHOD FOR CONFIGURING PILOT CHANNEL

(75) Inventors: Byung-Jang Jeong, Daegu (KR); Hyo-Jin Lee, Daegu (KR); Jae-Young Ahn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 116 days.

(21) Appl. No.: 12/064,804

(22) PCT Filed: Aug. 22, 2006

(86) PCT No.: PCT/KR2006/003300
§ 371 (c)(1), (2), (4) Date: Feb. 25, 2008

(87) PCT Pub. No.: WO2007/024091
PCT Pub. Date: Mar. 1, 2007

(65) Prior Publication Data
US 2009/0219801 A1    Sep. 3, 2009

(30) Foreign Application Priority Data
Aug. 23, 2005  (KR) .............. 10-2005-0077444
Feb. 3, 2006   (KR) .............. 10-2006-0010425

(51) Int. Cl.
    *H04J 11/00* (2006.01)
(52) U.S. Cl. ...................... 370/344; 370/210
(58) Field of Classification Search .......... 370/347, 370/465, 344
    See application file for complete search history.

(56) References Cited

U.S. PATENT DOCUMENTS 6,545,997 B1 * 4/2003 Bohnke et al. .......... 370/347
7,412,242 B2 * 8/2008 Cho et al. ............... 455/447

(Continued)

FOREIGN PATENT DOCUMENTS

EP          1 137 211         9/2001

(Continued)

OTHER PUBLICATIONS

ETRI, 3GPP TSG RAN WG1 Meeting #42, Pilot Structure for SC-FDMA, Aug. 29-Sep. 2, 2005, pp. 1-5.

(Continued)

*Primary Examiner*—Derrick W Ferris
*Assistant Examiner*—Mohammad Anwar
(74) *Attorney, Agent, or Firm*—Jae Y. Park; Kile Park Goekjian Reed & McManus PLLC (57) ABSTRACT

The present invention relates to a transmitter in a frequency division multiple access communication system. The transmitter generates a plurality of pilot symbols, and groups the plurality of pilot symbols into a plurality of groups according to a location of a subcarrier. In addition, the transmitter inverse fast Fourier transforms the pilot symbol in each group, and sequentially outputs a first pilot symbol sequence corresponding to each group. The transmitter generates a plurality of pilot blocks respectively corresponding to the plurality of groups, and converts the first pilot symbol sequence of each group into a second pilot symbol sequence of a corresponding pilot block among the plurality of pilot blocks.

19 Claims, 10 Drawing Sheets

U.S. PATENT DOCUMENTS

| | | | |
|---|---|---|---|
| 7,508,842 B2* | 3/2009 | Baum et al. | 370/468 |
| 7,512,412 B2* | 3/2009 | Mese et al. | 455/522 |
| 2003/0072254 A1 | 4/2003 | Ma et al. | |
| 2005/0094550 A1 | 5/2005 | Huh et al. | |

FOREIGN PATENT DOCUMENTS

| | | |
|---|---|---|
| KR | 10-0450936 B1 | 9/2003 |
| WO | 2005/041515 | 5/2005 |
| WO | 2007/024932 | 3/2007 |

OTHER PUBLICATIONS

NTT DoCoMo, 3GPP TSG RAN WG1 Ad Hoc On LTE, Physical Channels and Multiplexing in Evolved UTRA Uplink, Jun. 20-21, 2005, pp. 1-21.

International Search Report-PCT/KR2006/003300 dated Jun. 10, 2008.

Written Opinion-PCT/KR2006/003300 dated Jun. 10, 2008.

* cited by examiner

TRANSMITTER IN FDMA COMMUNICATION SYSTEM AND METHOD FOR CONFIGURING PILOT CHANNEL

BACKGROUND OF THE INVENTION (a) Field of the Invention

The present invention relates to a transmitter of a communication system and a method for configuring a pilot channel. More particularly, the present invention relates to a method for configuring a pilot channel in a frequency division multiple access (FDMA) communication system.

(b) Description of the Related Art

Frequency division multiple access (FDMA) channels for individual users include a localized FDMA (L-FDMA) channel and a distributed FDMA (D-FDMA) channel. In an L-FDMA method, symbols are allocated to contiguous subcarriers, which is efficient for allocating a local frequency having excellent characteristics for each user. In a D-FDMA method for allocating a distributed frequency to guarantee frequency diversity, symbols are allocated to equi-spaced subcarriers.

A transmitting terminal transmits a pilot signal to a receiving terminal so that the receiving terminal may estimate a value of a channel path. Since subcarriers forming the L-FDMA channel are contiguous in frequency domain, pilot information on only some subcarriers suffice to estimate channel response of a whole subcarriers belong to an interesting L-FDMA channel at receiver side. Accordingly, a length of a pilot block may be reduced to less than a length of a data block. However, since the D-FDMA channel consists of equi-spaced subcarriers, it is difficult to reduce the length of the pilot block to be shorter than that of the data block.

Accordingly, it is required to form a pilot block to be applied to the above two kinds of channel types so as to simultaneously support the L-FDMA channel and the D-FDMA channel in the communication system, and it is required to maintain a ratio of entire data to pilot to be lower than a predetermined ratio so as to efficiently perform communication.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a communication system having a pilot channel configuration that can be applied to various frequency division multiple access channel methods.

In the present invention, a plurality of pilot symbols are grouped according to a location of a subcarrier.

An exemplary transmitter in a frequency division multiple access communication system according to an embodiment of the present invention includes a pilot controller, an inverse fast Fourier transform unit, and a parallel/serial converter. The pilot controller generates a plurality of pilot symbols, and groups the plurality of pilot symbols into a plurality of groups according to a location of a subcarrier. The inverse fast Fourier transform unit inverse fast Fourier transforms the pilot symbols in each group, and sequentially outputs a first pilot symbol sequence corresponding to each group. The parallel/serial converter generates a plurality of pilot blocks respectively corresponding to the plurality of groups, and converts the first pilot symbol sequence of each group into a second pilot symbol sequence of a corresponding pilot block among the plurality of pilot blocks.

In this case, the pilot symbol generator may allocate pilot symbols of subcarriers having the same remainder when the location of the subcarrier is divided by a predetermined integer, to the same group. The predetermined integer may correspond to a length of the pilot block, and may correspond to a ratio of a length of data/control block output from the parallel/serial converter and the length of the pilot block.

The parallel/serial converter may select a symbol sequence corresponding to a length of the symbol sequence of the pilot block from among the first pilot symbol sequence corresponding to each group, serialize the selected symbol sequence, and generate the second pilot symbol sequence. The inverse fast Fourier transform unit performs an L size inverse fast Fourier transform operation for the pilot symbol corresponding to each group and generates the first pilot symbol sequence corresponding to each group. Here, the second pilot symbol sequence may be a serialized first pilot symbol sequence and L denotes the length of the pilot block.

In an exemplary method for configuring a pilot channel in a frequency division multiple access communication system according to another exemplary embodiment of the present invention, a plurality of input symbols corresponding to a user are inverse fast Fourier transformed, a data/control block having a first length symbol sequence is generated, a plurality of pilot symbols are grouped into a plurality of groups according to the location of the subcarrier, a plurality of first pilot symbols in a first group among the plurality of pilot symbols are inverse fast Fourier transformed, the first pilot symbol sequence having a second length that is shorter than the first length is generated, a first pilot block is generated by using the first pilot symbol, a plurality of second pilot symbols in a second group among the plurality of pilot symbols are inverse fast Fourier transformed, the second pilot symbol of the second length is generated, and a second pilot block is generated by using the second pilot symbol.

In an exemplary transmitter for transmitting a frame in a frequency division multiple access communication system according to a further exemplary embodiment of the present invention, the frame includes a plurality of sub-frames, at least one sub-frame among the plurality of sub-frames includes a plurality of data/control blocks respectively having a data signal or a control signal and a plurality of pilot blocks respectively having a pilot signal, and a sum of lengths of the plurality of pilot blocks corresponds to a length of one data/control block.

In an exemplary transmitter for transmitting a frame in a frequency division multiple access communication system according to a still further embodiment of the present invention, at least one sub-frame forming the frame includes a plurality of data/control blocks respectively having a data signal or a control signal and a plurality of pilot blocks respectively having a pilot symbols column, a plurality of pilot symbols are grouped into a plurality of groups according to a location of subcarrier, and the pilot symbol sequence of each pilot block is generated by the pilot symbol in a corresponding group among the plurality of groups.

In an exemplary transmitter for transmitting a frame in a frequency division multiple access communication system according to a still further embodiment of the present invention, at least one sub-frame forming the frame includes a plurality of data/control blocks respectively having a data signal or a control signal and a plurality of pilot blocks respectively having a pilot symbol sequence, and the pilot symbol sequence of each pilot block is formed by some of a symbol sequence in which a plurality of pilot symbols corresponding to each pilot block is inverse fast Fourier transformed.

In an exemplary method for configuring a pilot channel in a frequency division multiple access communication system according to a still further embodiment of the present invention, a plurality of pilot symbols are grouped into a plurality of groups according to a location of subcarrier, a pilot symbol in a $b^{th}$ group among the plurality of groups is inverse fast Fourier transformed, a symbol sequence $\{d_n^b, n=0, 1, \ldots, L-1\}$ is generated, and a $b^{th}$ pilot block among a plurality of pilot blocks is generated by using the symbol sequence $\{d_n^b, n=0, 1, \ldots, L-1\}$. In this case, $d_n^b$ is given as $$\sum_{k \in S_b} D_k \cdot e^{j2\pi nk/N},$$

$S_b$ denotes the $b^{th}$ group, $D_k$ denotes a pilot symbol in a $k^{th}$ subcarrier, N denotes a length of a data/control block, L denotes a length of a $b^{th}$ pilot block, and b denotes an integer between 0 and $((N/L)-1)$.

In addition, a latter part of the symbol sequence $\{d_n, n=0, 1, \ldots, N-1\}$ is copied and a cyclic prefix for the $b^{th}$ pilot block is generated. Here, a symbol sequence $\{d_n, n=0, 1, \ldots, N-1\}$ is given as $d_{n+mL}=d_n^b \cdot e^{j2\pi bmL/N}$, $n=0, 1, \ldots, L-1$ and $m=0, 1, \ldots, N/L-1$ with respect to the symbol sequence $\{d_n^b, n=0, 1, \ldots, L-1\}$.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims which follow, when it is described that an element is "coupled" to another element, the element may be "directly coupled" to the other element or "electrically coupled" to the other element through a third element.

A transmitter in a frequency division multiple access (FDMA) communication system according to an exemplary embodiment of the present invention and a method for configuring a pilot signal will now be described with reference to the figures.

Figure 1:
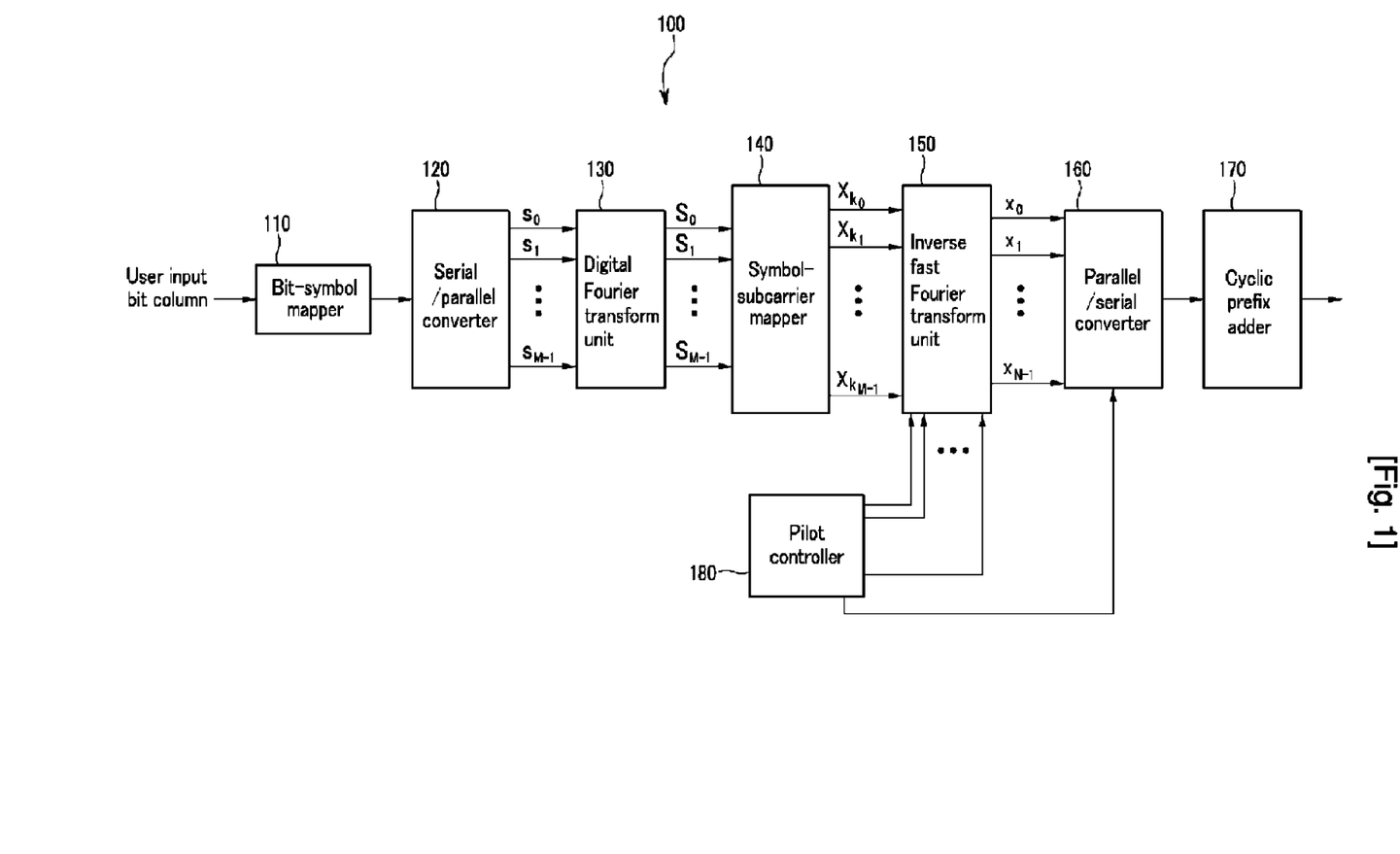
FIG. 1 shows a block diagram of a transmitter in a frequency division multiple access (FDMA) communication system according to a first exemplary embodiment of the present invention.
Figure 2:
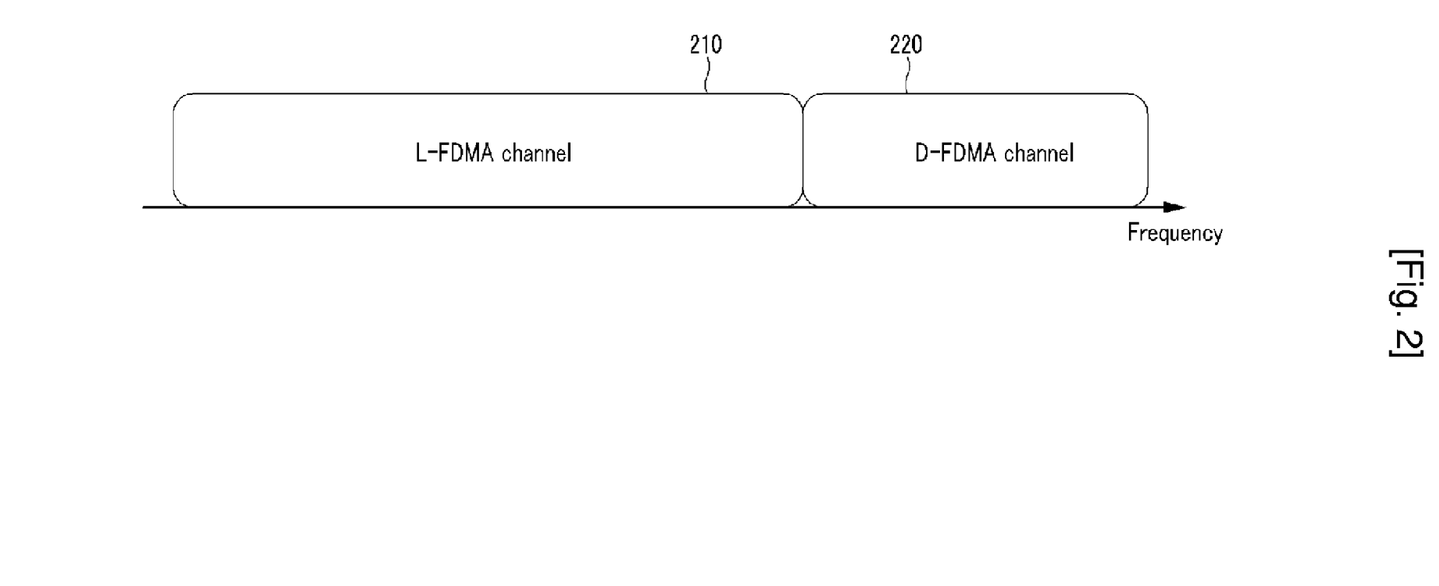
FIG. 2 and FIG. 3 show diagrams representing a method for multiplexing a localized FDMA (L-FDMA) channel and a distributed FDMA (D-FDMA) channel in a frequency domain.
Figure 3:
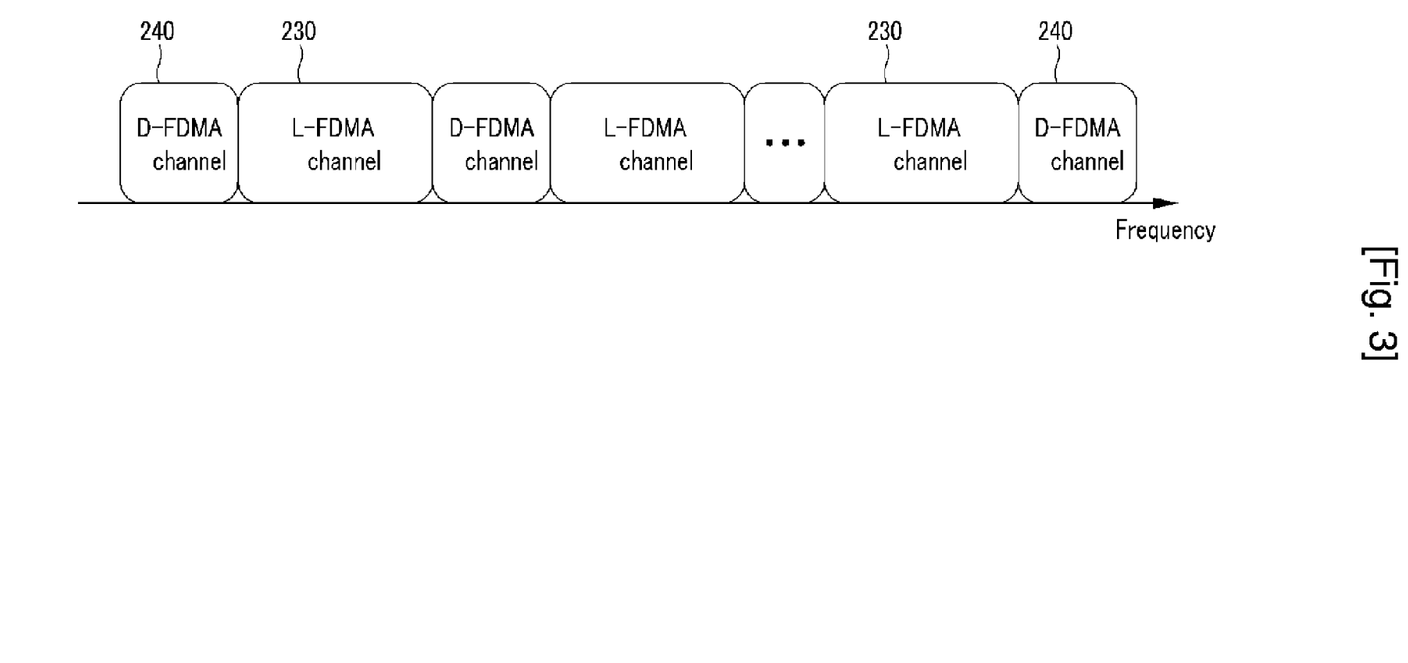
Figure 4:
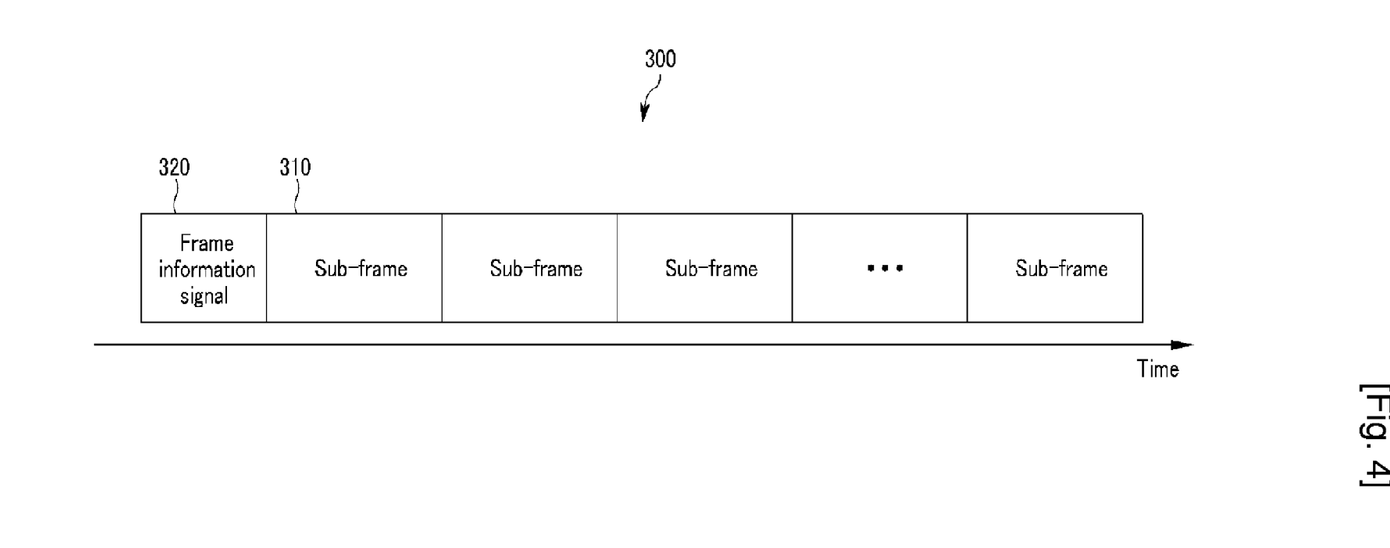
FIG. 4 shows a diagram of a frame configuration of the transmitter according to the first exemplary embodiment of the present invention.
Figure 5:
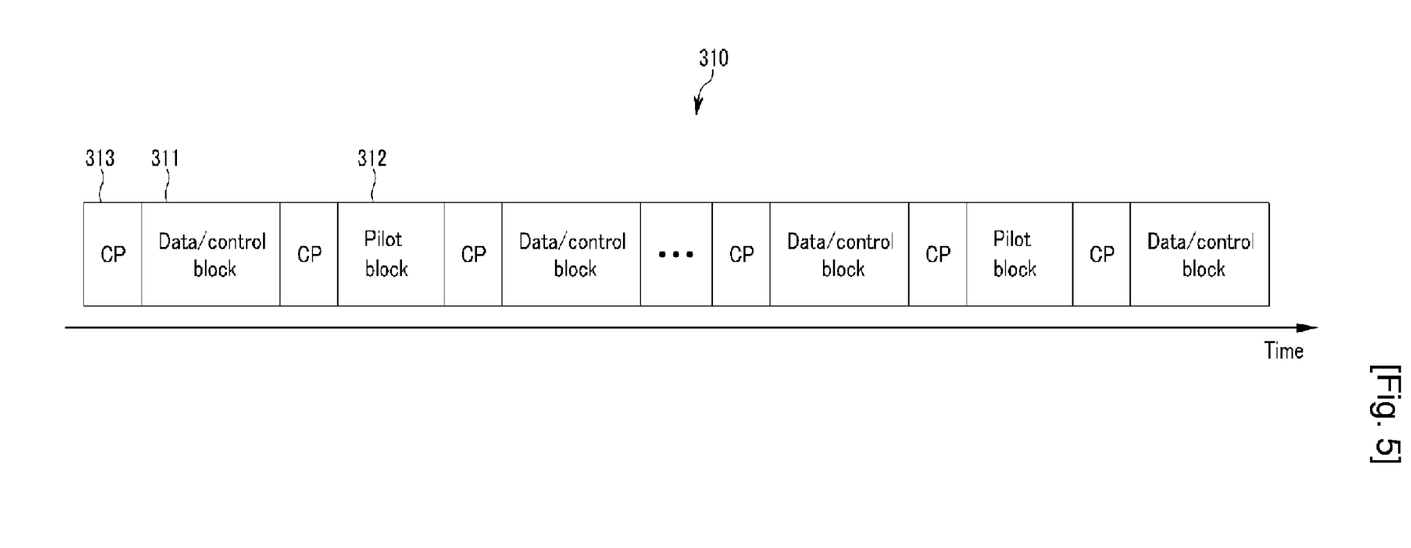
FIG. 5 shows a diagram of a sub-frame configuration of a frame shown in FIG. 4.

FIG. 1 shows a block diagram of a transmitter in a FDMA communication system according to a first exemplary embodiment of the present invention, and FIG. 2 and FIG. 3 show diagrams representing a method for multiplexing the L-FDMA channel and the D-FDMA channel in a frequency domain. FIG. 4 shows a diagram of a frame configuration of the transmitter according to the first exemplary embodiment of the present invention, and FIG. 5 shows a diagram of a sub-frame configuration of a frame shown in FIG. 4.

As shown in FIG. 1, the transmitter 100 according to the first exemplary embodiment of the present invention includes a bit-symbol mapper 110, a serial/parallel converter 120, a digital Fourier transform unit 130, a symbol-subcarrier mapper 140, an inverse fast Fourier transform (IFFT) unit 150, a parallel/serial converter 160, a cyclic prefix adder 170, and a pilot controller 180.

The bit-symbol mapper 110 converts an input bit column that is encoded and interleaved for a user into a serial symbol sequence, and a serial/parallel converter 120 converts the serial symbol sequence to be parallel. The digital Fourier transform unit 130 digitally Fourier transforms M parallel symbols $\{s_i, i=0, 1, \ldots, M-1\}$, and the M parallel symbols may be spread and mixed in a digital Fourier transform process. However, in an orthogonal frequency division multiplexing access (OFDMA) method, the digital Fourier transform process may be omitted.

According to a user channel environment and a required service, the symbol-subcarrier mapper 140 determines a location of a subcarrier for transmitting the parallel symbol sequence $\{S_i, i=0, 1, \ldots, M-1\}$ in one method of the L-FDMA and D-FDMA methods. That is, the symbol-subcarrier mapper 140 allocates a symbol to the contiguous subcarriers to form the L-FDMA channel, and allocates the symbol to the subcarriers distributed to respectively have a predetermined interval therebetween to form the D-FDMA channel.

The IFFT unit 150 performs an N size inverse fast Fourier transform operation for a symbol sequence $\{X_k, k=k_0, k_1, \ldots, k_{M-1}\}$ having the subcarrier location determined by the symbol-subcarrier mapper 140 to form a symbol sequence $\{x_n, n=0, 1, \ldots, N-1\}$ as given in Equation 1.

$$x_n = \sum_{k=k_0}^{k_{M-1}} X_k \cdot e^{j2\pi nk/N} \quad \text{[Equation 1]}$$

Here, $\{k=k_0, k_1, \ldots, k_{M-1}\}$ is given as $\{k=p, p+1, \ldots, p+M-1\}$ in a case of the L-FDAM channel since the M neighboring subcarriers form the L-FDAM channel, and $\{k=k_0, k_1, \ldots, k_{M-1}\}$ is given as $\{k=p, p+Q, \ldots, p+(M-1)Q\}$ in a case of the D-FDMA channel since the M subcarriers distributed with a predetermined interval Q form the D-FDMA channel.

The parallel/serial converter 160 serializes the symbol sequence $\{x_n, n=0, 1, \ldots, N-1\}$ that is inverse fast Fourier transformed as in Equation 1 so as to generate a data/control block, and a length of the data/control block is N. Here, the length of the data/control block is a length of a symbol sequence at a time domain in the data/control block. The cyclic prefix adder 170 copies some of the serial symbol sequence, generates a cyclic prefix (CP), and adds the CP to the data/control block. The CP is for maintaining orthogonality at a radio channel link and processing a frequency domain signal at a receiving terminal.

The pilot controller 180 generates a pilot symbol and transmits the pilot symbol to the IFFT unit 150. The IFFT unit 150 inverse fast Fourier transforms the pilot symbol and outputs it. According to a control operation of the pilot controller 180, the parallel/serial converter 160 selects a part of the pilot symbol sequence that is inverse fast Fourier transformed, serializes the selected symbol sequence, and generates a pilot block. Accordingly, a length of the pilot block is reduced to less than the length of the data/control block. The cyclic prefix adder 170 copies a part of the serial pilot symbol sequence, generates the CP, and adds the CP to the pilot block. The transmitter 100 generates the plurality of pilot blocks and allocates them to the sub-frame to form a pilot channel.

The above process is equally applied to other user signals so that users may share the entire channel to communicate with each other. In this case, the L-FDMA channel or the D-FDMA channel is allocated for each user according to the user channel environment and the required service, and the L-FDMA channel and the D-FDMA channel may be multiplexed at the frequency domain as shown in FIG. 2 or in FIG. 3. In detail, the entire frequency bandwidth is divided into two regions as shown in FIG. 2, and the L-FDMA channel 210 and the D-FDMA channel 220 are allocated to the two divided regions to be multiplexed. In addition, as shown in FIG. 3, a plurality of L-FDMA channels 230 and a plurality of D-FDMA channels 240 are alternately allocated to the entire frequency bandwidth to be multiplexed.

A frame 300 of a transmission signal formed in the above process includes a plurality of sub-frames 310 as shown in FIG. 4, and a frame information signal 320 including information on the frame 300 may be formed in the frame 300. As shown in FIG. 5, one sub-frame 310 includes a plurality of data/control blocks 311, a plurality of pilot blocks 312, and a plurality of CPs 313. As described above, a channel of the data/control block 311 is multiplexed at the frequency domain by the symbol-subcarrier mapper 140 shown in FIG. 1 as shown in FIG. 2 and FIG. 3, and the CP 313 is added by the cyclic prefix adder 170 in FIG. 1. The respective pilot blocks 312 include a pilot symbol sequence having a length that is shorter than that of one data/control block 311.

A method for generating the pilot block 312 will now be described with reference to FIG. 6 and FIG. 7.

Figure 6:
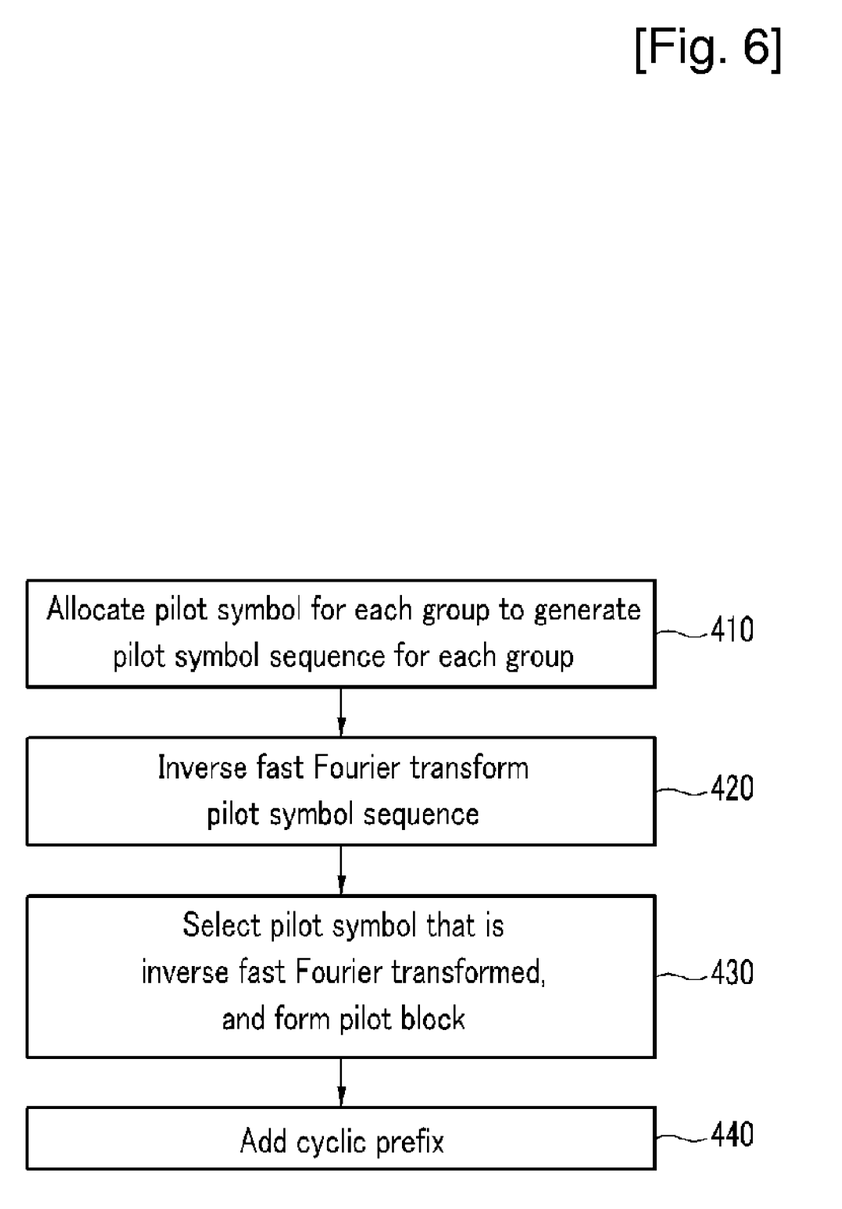
FIG. 6 shows a diagram representing a method for configuring a pilot channel in the transmitter according to the first exemplary embodiment of the present invention.
Figure 7:
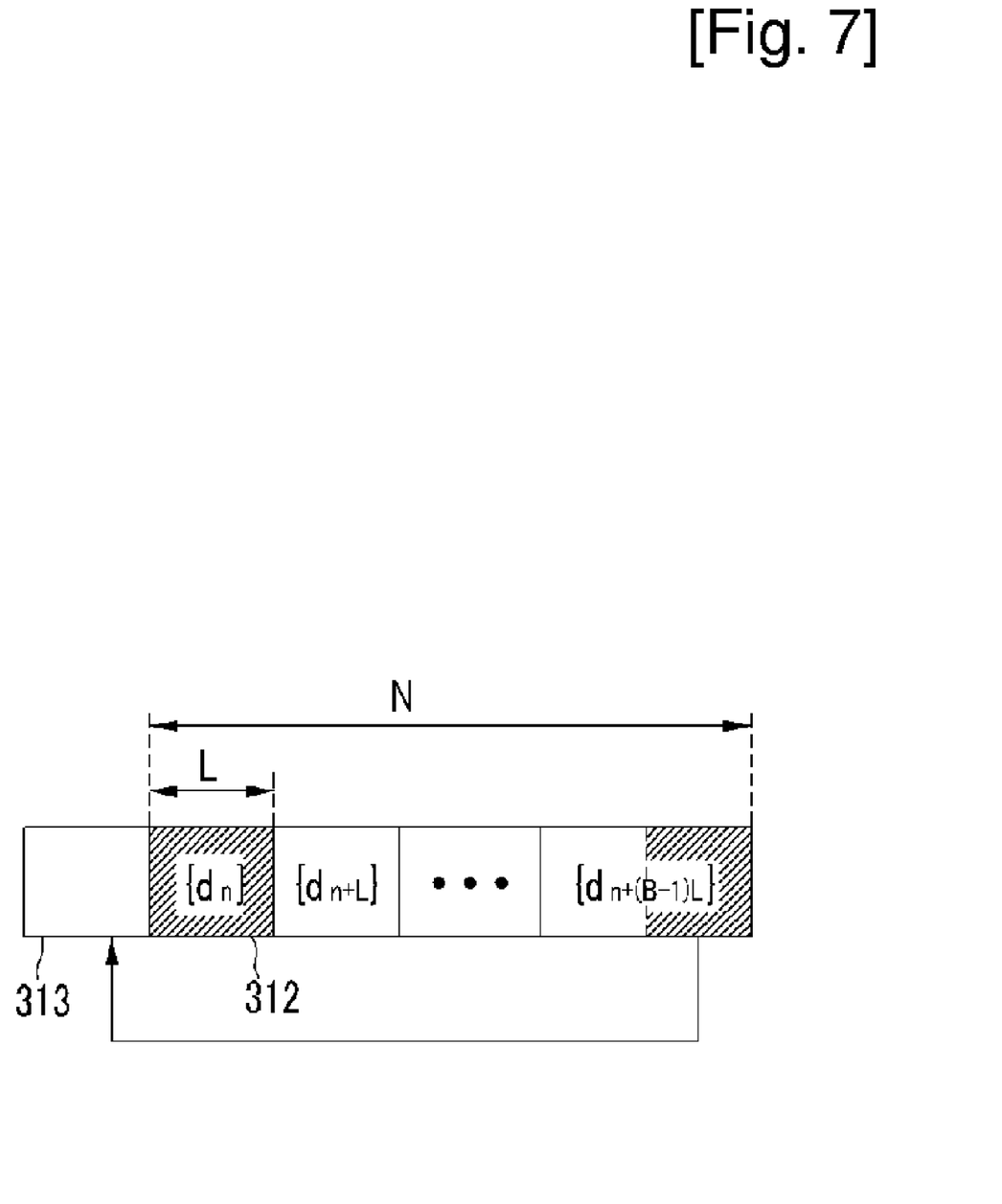
FIG. 7 shows a diagram representing a method for configuring a pilot block and a CP added to the pilot block.

FIG. 6 shows a diagram representing a method for configuring the pilot channel in the transmitter according to the first exemplary embodiment of the present invention, and FIG. 7 shows a diagram representing a method for configuring a pilot block and a CP added to the pilot block.

It is assumed that B pilot blocks 312 form a pilot channel in a subframe in FIG. 6 and FIG. 7 (B is the number of pilot blocks), and for convenience of description, a method for generating one pilot block among the B pilot blocks 312 is shown.

The pilot controller 180 shown in FIG. 1 generates a plurality of pilot symbols, the plurality of pilot symbols are divided into B groups, and pilot symbol sequences for the B groups are respectively allocated to the B pilot blocks 312 shown in FIG. 5. In further detail, the pilot controller 180 generates a pilot symbol sequence $\{D_k, k=k_0, k_1, \ldots, k_{M-1}\}$ for a $b^{th}$ pilot block 312 among the B pilot blocks 312 as shown in Equation 2 in step S410. That is, the pilot controller 180 allocates the pilot symbol $D_k$ to a $k^{th}$ subcarrier satisfying (k modulo B)=b, and allocates no pilot symbol to a $k^{th}$ subcarrier that does not satisfy (k modulo B)=b.

$$D_k \begin{cases} \neq 0, & k \in S_b \\ = 0, & k \notin S_b \end{cases}$$ [Equation 2]

Here, $S_b = \{k | (k \text{ modulo } B) = b\}$, and b is an integer between 0 and B−1.

The IFFT unit 150 inverse fast Fourier transforms the pilot symbol $\{D_k, k=k_0, k_1, \ldots, k_{M-1}\}$, and generates the pilot symbol sequence $\{d_n, n=0, 1, \ldots, N-1\}$ at a time domain as shown in Equation 3 in step S420.

$$d_n = \sum_{k \in S_b} D_k \cdot e^{j2\pi nk/N}, n = 0, 1, \ldots, N-1$$ [Equation 3]

Here, $D_k$ denotes a pilot symbol in a $k^{th}$ subcarrier

Accordingly, since the pilot symbol sequence $D_k$ satisfying $k \in S_b$ is inverse fast Fourier transformed to form the symbol sequence $\{d_n, n=0, 1, \ldots, N-1\}$, a block of $\{d_n, n=0, 1, \ldots, L-1\}$ is repeated B times to form the symbol sequence $\{d_n, n=0, 1, \ldots, N-1\}$ In this case, as shown in FIG. 7, $\{d_n, n=0, 1, \ldots, L-1\}$ is multiplied by the value b and a constant $e^{j2\pi bmL/N}$ that is determined according to how many times the block is repeated, so as to form the repeated block $\{d_{n+L}, n=0, 1, \ldots, L-1\}, \ldots, \{d_{n+(B-1)L}, n=0, 1, \ldots, L-1\}$. That is, the symbol sequence $\{d_n, n=0, 1, \ldots, N-1\}$ satisfies Equation 4.

[Equation 4]

$$d_{n+mL} = d_n \cdot e^{j2\pi bmL/N}, n=0, 1, \ldots, L-1 \text{ and } m=0, 1, \ldots, B-1$$

Here, L denotes a length allocated to the pilot block 312, and B=N/L.

Since the length L of the pilot block 312 and the number of the pilot blocks 312 satisfy L=N/B in Equation 4, the parallel/serial converter 160 serializes L symbols $\{d_n, n=0, 1, \ldots, L-1\}$ among N time domain pilot symbols according to a control operation of the pilot controller 180 as shown in FIG. 7, and forms a $b^{th}$ pilot block 312 in step S430. That is, since a block including the L symbols is multiplied by a constant B times to form the N pilot symbols, the L symbols $\{d_n, n=0, 1, \ldots, L-1\}$ form the pilot block 312. Accordingly, the pilot symbol sequence $\{d_n^b, n=0, 1, \ldots, L-1\}$ of the $b^{th}$ pilot block 312 is given as Equation 5.

$$d_n^b = \sum_{k \in S_b} D_k \cdot e^{j2\pi nk/N}, n = 0, 1, \ldots, L-1$$ [Equation 5]

The cyclic prefix adder 170 adds the cyclic prefix (CP) 313 to the $b^{th}$ pilot block 312 in step S440. In this case, the CP 313 is formed by copying a latter part of the N symbol sequence $\{d_n\}, \{d_{n+L}\}, \ldots, \{d_{n+(B-1)L}\}$ as shown in FIG. 7.

In the above process, the $b^{th}$ pilot block and the CP thereof may be formed. In addition, the above process is performed for the pilot symbol sequence $D_k$ satisfying $k \in S_{b+1}$ to form a $(b+1)^{th}$ pilot block and a CP of the $(b+1)^{th}$ pilot block, and the above process is repeatedly performed to form B pilot symbols allocated to one frame, so that the pilot channel is formed.

While it has been described that an N size IFFT unit is used when the pilot symbol is inverse fast Fourier transformed in the first exemplary embodiment of the present invention, differing from the first exemplary embodiment of the present invention, an L size IFFT unit may be used.

Figure 8:
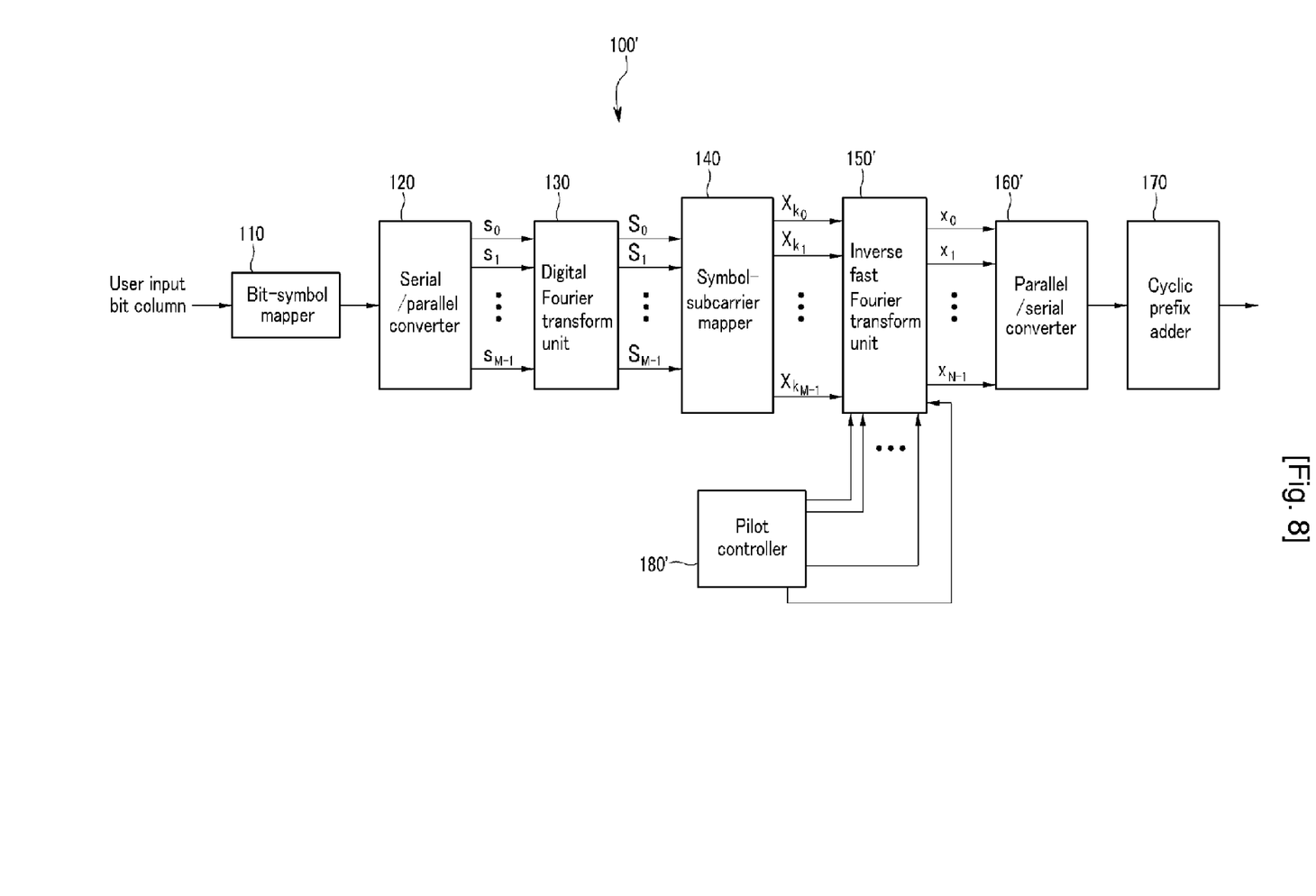
FIG. 8 shows a block diagram of a transmitter in an FDMA system according to a second exemplary embodiment of the present invention.

FIG. 8 shows a block diagram of a transmitter in an FDMA system according to a second exemplary embodiment of the present invention.

As shown in FIG. 8, differing from the transmitter according to the first exemplary embodiment of the present invention, a pilot controller 180' controls an inverse fast Fourier transform (IFFT) unit 150' in the transmitter 100' according to the second exemplary embodiment of the present invention. In further detail, the pilot controller 180' controls the IFFT unit 150' to perform an L size equivalent IFFT operation when the IFFT unit 150' inverse fast Fourier transforms the pilot symbol sequence $D_k$ satisfying $k \in S_b$. Accordingly, the IFFT unit 150' performs the L size equivalent inverse fast Fourier transform operation for the pilot symbol $D_k$ satisfying $k \in S_b$, so that a symbol sequence $\{d_n^b, n=0, 1, \ldots, L-1\}$ given as Equation 5 may be output.

Figure 9:
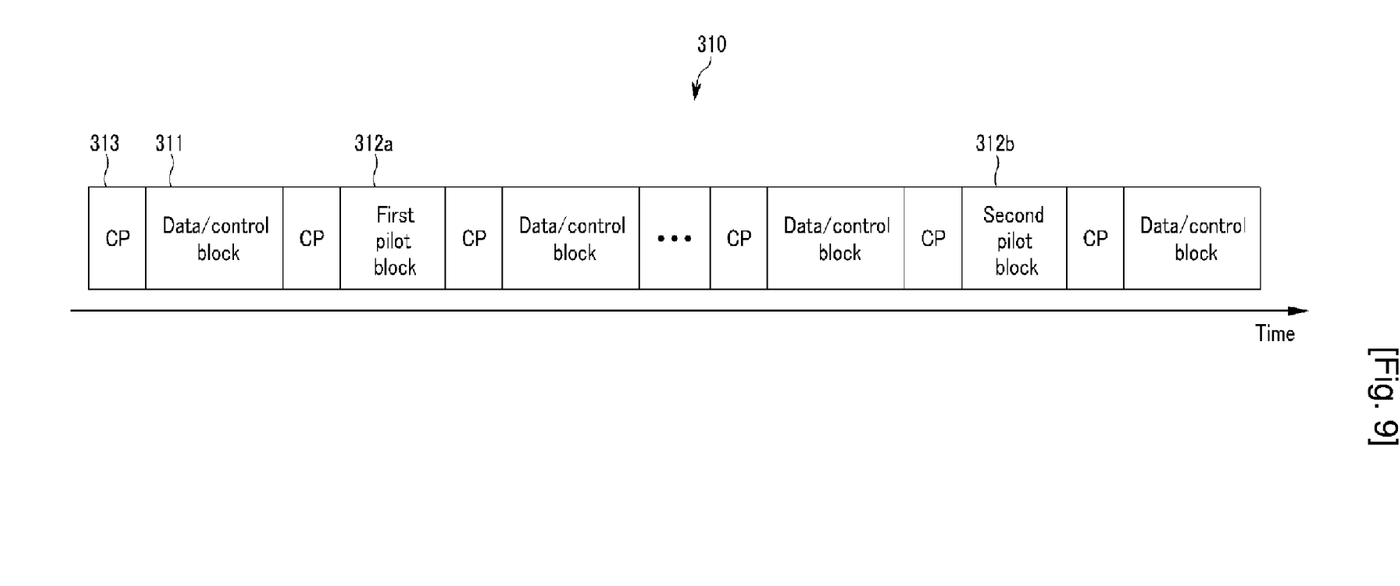
FIG. 9 and FIG. 10 respectively show diagrams representing a sub-frame configuration and a pilot symbol when two pilot blocks are formed according to the first and second exemplary embodiments of the present invention.
Figure 10:
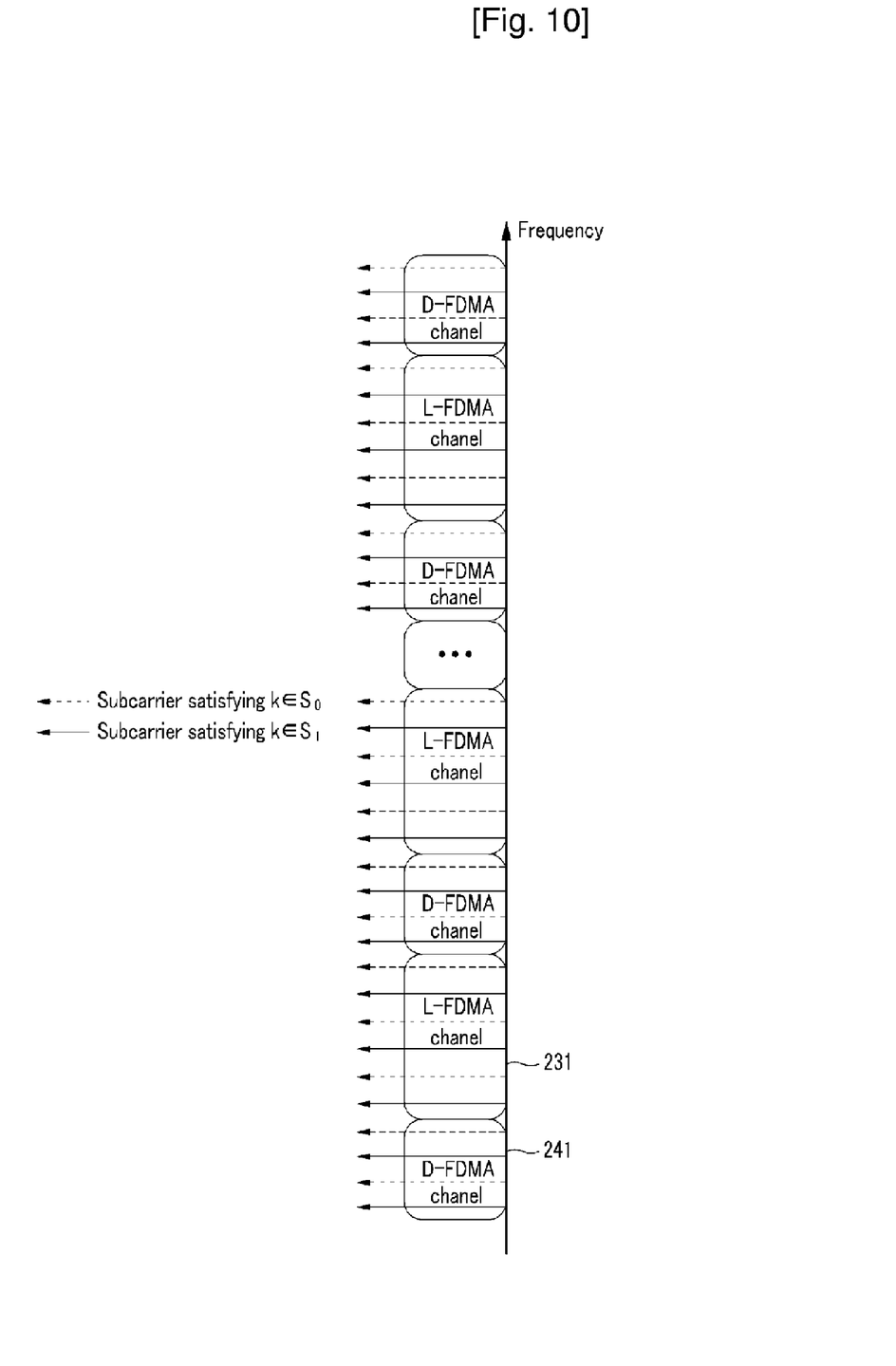

FIG. 9 and FIG. 10 respectively show diagrams representing a sub-frame configuration and a pilot symbol when two pilot blocks are formed according to the first and second exemplary embodiments of the present invention.

Referring to FIG. 7, the frequency domain of the sub-frame 310 is multiplexed into the plurality of L-FDMA channels 231 and the plurality of D-FDMA channels 241. Among the pilot symbol sequences $\{D_k, k=k_0, k_1, \ldots, k_{M-1}\}$ that are inverse fast Fourier transformed for the subcarrier satisfying $k \in S_0$, the L symbol sequences $d_n^0, n \in \{0, 1, \ldots, L-1\}$ are transmitted through a first pilot block 312a. In a like manner, among the pilot symbol symbols $\{D_k, k=k_0, k_1, \ldots, k_{M-1}\}$ that are inverse fast Fourier transformed for the subcarrier satisfying $k \in S_1$, the L symbol sequences $d_n^1, n \in \{0, 1, \ldots, L-1\}$ are transmitted through the second pilot block 312b. Here, L corresponds to N/2.

The CP for the first pilot block 312a may be formed by copying a part of the latter part $\{d_{n \bmod N/2}^0, n=N/2, N/2+1, \ldots, N-1\}$ of the N symbol sequences in Equation 6 calculated from Equation 4. In a like manner, the CP for the second pilot block 312b may be formed by copying a part of the latter part $\{-d_{n \bmod N/2}^1, n=N/2, N/2+1, \ldots, N-1\}$ of the N symbol sequences in Equation 7 calculated from Equation 4.

$$d_n = \begin{cases} d_n^0, n = 0, 1, \ldots, N/2-1 \\ d_{n \bmod N/2}^0 \cdot e^{j\pi 0} = d_{n \bmod N/2}^0, n = N/2, N/2+1, \ldots, N-1 \end{cases}$$ [Equation 6]

$$d_n = \begin{cases} d_n^1, n = 0, 1, \ldots, N/2-1 \\ d_{n \bmod N/2}^1 \cdot e^{j\pi} = -d_{n \bmod N/2}^1, n = N/2, N/2+1, \ldots, N-1 \end{cases}$$ [Equation 7]

Accordingly, as shown in FIG. 7, the pilot information for the L-FDMA channel and the D-FDMA channel may be transmitted in the same configuration. Here, the L-FDMA channel is not required to transmit pilot information to all the subcarriers since a channel is formed by using contiguous subcarriers, and the D-FDMA channel is required to transmit the pilot information to the subcarriers since the channel is formed by using the equi-spaced subcarriers. In addition, since the length of the entire pilot symbol sequence for one sub-frame is N and the entire pilot symbol sequence is divided into two pilot blocks 312a and 312b to be transmitted, a receiving terminal may estimate time variance of the channel.

Constituent elements in the exemplary embodiment of the present invention may be realized by using at least one digital signal processor (DSP), a controller, an application specific integrated circuit (ASIC), and an FPGA (field programmable gate array), electronic devices, or a combination thereof. At least some of functions or processes in the exemplary embodiment of the present invention may be realized as software, and the software may be recorded in a recording medium. In addition, the constituent elements, functions, and processes in the exemplary embodiment of the present invention may be realized as a combination of hardware and software.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. According to the exemplary embodiment of the present invention, the pilot information for the L-FDMA and D-FDMA channels in the communication system including the two channels may be transmitted in the same configuration. In addition, since the pilot symbols are grouped, are divided into a plurality of pilot blocks, and are transmitted, the limited pilot information may be used, and the receiving terminal may easily estimate the time variance of the channel.

The invention claimed is:

1. A transmitter in a frequency division multiple access communication system, the transmitter comprising:
    a pilot controller for generating a plurality of pilot symbols, and grouping the pilot symbols into a plurality of groups according to a location of a subcarrier;
    an inverse fast Fourier transform unit for inverse fast Fourier transforming the pilot symbols in each group, and sequentially outputting a first pilot symbol sequence corresponding to each group; and
    a parallel/serial converter for generating a plurality of pilot blocks respectively corresponding to the groups, and converting the first pilot symbol sequence of each group into a second pilot symbol sequence of a corresponding pilot block among the pilot blocks,
    wherein the pilot symbol generator allocates pilot symbols of subcarriers, the subcarriers having the same remainder when the location of the subcarrier is divided by a predetermined integer, to the same group, and
    wherein the predetermined integer corresponds to a ratio of a length of a data/control block output from the parallel/serial converter and a length of the pilot block.

2. The transmitter of claim 1, wherein the parallel/serial converter selects a symbol sequence corresponding to a length of the symbol sequence of the pilot block from among the first pilot symbol sequence corresponding to each group, serializes the selected symbol sequence, and generates the second pilot symbol sequence.

3. The transmitter of claim 2, wherein, when the inverse fast Fourier transform unit inverse fast Fourier transforms the pilot symbol of each group, the pilot controller sets a symbol of a subcarrier to be 0 except a subcarrier corresponding to each group, and transmits the set symbol to the inverse fast Fourier transform unit.

4. The transmitter of claim 1, wherein:
    the inverse fast Fourier transform unit performs an L size inverse fast Fourier transform operation for the pilot symbol corresponding to each group and generates the first pilot symbol sequence corresponding to each group; and the second pilot symbol sequence is a serialized first pilot symbol sequence and L denotes the length of the pilot block.

5. The transmitter of claim 1, further comprising a cyclic prefix adder for copying a latter part of an N length symbol sequence corresponding to the second pilot symbol sequence of each pilot block and generating a cyclic prefix for each pilot block, wherein N denotes the length of the data/control block.

6. The transmitter of claim 5, wherein the N length symbol sequence is generated by the symbol sequence of each pilot block and at least one symbol sequence generated by multiplying the symbol sequence of each pilot block by at least one constant.

7. The transmitter of claim 1, further comprising a symbol-subcarrier mapper for determining a location of a subcarrier for transmitting the symbol corresponding to the data/control block by one method among an orthogonal frequency division multiplexing access (OFDMA) method and a distributed frequency division multiple access (D-FDMA) method.

8. A method for configuring a pilot channel in a frequency division multiple access communication system, the method comprising:
inverse fast Fourier transforming a plurality of input symbols corresponding to a user, and generating a data/control block having a symbol sequence of a first length;
grouping a plurality of pilot symbols into a plurality of groups according to a location of a subcarrier;
inverse fast Fourier transforming a plurality of first pilot symbols in a first group among the plurality of pilot symbols, and generating a first pilot symbol sequence having a second length that is shorter than the first length;
generating a first pilot block by using the first pilot symbol sequence;
inverse fast Fourier transforming a plurality of second pilot symbols in a second group among the plurality of pilot symbols, and generating a second pilot symbol sequence of the second length; and
generating a second pilot block by using the second pilot symbol sequence,
wherein the second length is obtained by dividing the first length by the number of groups.

9. The method of claim 8, wherein:
the generating of the first pilot symbol sequence comprises setting a symbol of a subcarrier of a group except the first group to be 0 and inverse fast Fourier transforming the symbol; and
the generating of the second pilot symbol sequence comprises setting a symbol of a subcarrier of a group except the second group to be 0 and inverse fast Fourier transforming the symbol.

10. The method of claim 8, wherein:
the generating of the first pilot symbol sequence comprises performing a first length inverse fast Fourier transform operation for the plurality of first pilot symbols, generating a third pilot symbol sequence, and selecting the first pilot symbol sequence of the second length from among the third pilot symbol sequence; and
the generating of the second pilot symbol sequence comprises performing the first length inverse fast Fourier transform operation for the plurality of second pilot symbols, generating a fourth pilot symbol sequence, and selecting the second pilot symbol sequence of the second length from among the fourth pilot symbol sequence.

11. The method of claim 8, wherein:
the generating of the first pilot symbol sequence comprises performing a second length inverse fast Fourier transform operation for the plurality of first pilot symbols, and generating the first pilot symbol sequence; and
the generating of the second pilot symbol sequence comprises performing the second length inverse fast Fourier transform operation for the plurality of second pilot symbols, and generating the second pilot symbol sequence.

12. The method of claim 8, further comprising:
copying a part of the first length symbol sequence corresponding to the first pilot symbol sequence, and generating a first cyclic prefix for the first pilot block; and
copying a part of the first length symbol sequence corresponding to the second pilot symbol sequence, and generating a second cyclic prefix for the second pilot block.

13. A transmitter for transmitting a frame in a frequency division multiple access communication system,
wherein the transmitter transmits a frame including a plurality of sub-frames, at least one sub-frame among the plurality of sub-frames comprising:
a plurality of data/control blocks respectively having a data signal or a control signal, and
a plurality of pilot blocks respectively having a pilot signal, wherein a sum of lengths of the plurality of pilot blocks corresponds to a length of one data/control block,
wherein a length of each pilot block is N/B when B denotes the number of the pilot blocks and N denotes the length of one data/control block, and B is a positive integer that is more than 2, and N is greater than B.

14. The transmitter of claim 13, wherein the plurality of pilot blocks respectively correspond to integers 0 to (B−1), and a pilot block corresponding to an integer b among the plurality of pilot blocks is formed by a pilot symbol of a subcarrier having a remainder of b when locations of the plurality of subcarriers are divided by B.

15. The transmitter of claim 14, wherein the symbol sequence of the pilot block corresponding to b is given as $$d_n^b = \sum_{k \in S_b} D_k \cdot e^{j2\pi nk/N}, n = 0, 1, \ldots, L-1,$$

$D_k$ denotes a pilot symbol of a $k^{th}$ subcarrier before an inverse fast Fourier transform operation is performed, and $S_b$ denotes a set of k having the remainder of b when the k is divided by B.

16. The transmitter of claim 13, wherein the at least one sub-frame further comprises a plurality of cyclic prefixes respectively corresponding to the plurality of data/control blocks and the plurality of pilot blocks.

17. The transmitter of claim 13, wherein, in the at least one sub-frame, a plurality of subcarriers of the plurality of data/control blocks comprises a group having a localized frequency division multiple access channel, and a group having a distributed frequency division multiple access channel.

18. A method for configuring a pilot channel in a frequency division multiple access communication system, the method comprising:
grouping a plurality of pilot symbols into a plurality of groups according to a location of a subcarrier;
inverse fast Fourier transforming a pilot symbol in a $b^{th}$ group among the plurality of groups, and generating a symbol sequence $\{d_n^b, n=0, 1, \ldots, L-1\}$; and
generating a $b^{th}$ pilot block among a plurality of pilot blocks by using the symbol sequence $\{d_n^b, n=0, 1, \ldots, L-1\}$, wherein $d_n^b$ is given as $$\sum_{k \in S_b} D_k \cdot e^{j2\pi nk/N},$$

$S_b$ denotes the $b^{th}$ group, $D_k$ denotes a pilot symbol in a $k^{th}$ subcarrier, N denotes a length of a data/control block, L denotes a length of a $b^{th}$ pilot block, and b denotes an integer between 0 and ((N/L)−1).

19. The method of claim 18, further comprising copying a latter part of the symbol sequence $\{d_n, n=0, 1, \ldots, N-1\}$ and generating a cyclic prefix for the $b^{th}$ pilot block, wherein a symbol sequence $\{d_n, n=0, 1, \ldots, N-1\}$ is given as $d_{n+mL} = d_n^b \cdot e^{j2\pi bmL/N}$, $n=0, 1, \ldots, L-1$ and $m=0, 1, \ldots, N/L-1$ with respect to the symbol sequence $\{d_n^b, n=0, 1, \ldots, L-1\}$.

* * * * *